(12) United States Patent
Scheel et al.

(10) Patent No.: US 7,167,381 B2
(45) Date of Patent: Jan. 23, 2007

(54) DIGITAL STATE CONTROLLER FOR A HIGH-VOLTAGE GENERATOR USING THE MIXED-MODE MODULATION METHOD

(75) Inventors: Thomas Scheel, Stolberg (DE); Christian Hattrup, Würselen (DE)

(73) Assignee: Koninklijke Philips Electronics, N.V., Eindhoven (NL)

( * ) Notice: Subject to any disclaimer, the term of this patent is extended or adjusted under 35 U.S.C. 154(b) by 0 days.

(21) Appl. No.: 10/542,132

(22) PCT Filed: Jan. 13, 2004

(86) PCT No.: PCT/IB2004/000039
§ 371 (c)(1),
(2), (4) Date: Jul. 12, 2005

(87) PCT Pub. No.: WO2004/064237
PCT Pub. Date: Jul. 29, 2004

(65) Prior Publication Data
US 2006/0050538 A1     Mar. 9, 2006

(30) Foreign Application Priority Data
Jan. 16, 2003     (EP) .................. 03100076

(51) Int. Cl.
*H02M 3/335*     (2006.01)
*H02M 7/44*     (2006.01)

(52) U.S. Cl. ..................... 363/17; 363/98; 363/134

(58) Field of Classification Search .......... 363/17, 363/25, 98, 132, 134
See application file for complete search history.

(56) References Cited

U.S. PATENT DOCUMENTS

| | | | | |
|---|---|---|---|---|
| 5,267,138 A | * | 11/1993 | Shores | 363/98 |
| 5,504,668 A | * | 4/1996 | Beyerlein et al. | 363/95 |
| 5,684,678 A | * | 11/1997 | Barrett | 363/17 |
| 6,215,675 B1 | * | 4/2001 | Laeuffer et al. | 363/17 |
| 6,324,080 B1 | * | 11/2001 | Laeuffer | 363/25 |
| 6,711,533 B1 | * | 3/2004 | Aymard et al. | 703/13 |

FOREIGN PATENT DOCUMENTS

| | | |
|---|---|---|
| EP | 0902528 A2 | 3/1999 |
| EP | 1030435 A1 | 8/2000 |
| EP | 0902528 A3 | 5/2001 |
| WO | WO 01/37416 A2 | 5/2001 |

OTHER PUBLICATIONS

J. Laeuffer, et al.; A Control Analysis and Closed-Loop Design for Serie-Parallel Resonant Converters; Sep. 1997; vol. 4 Conf. 7; pp. 4379-4384.

* cited by examiner

*Primary Examiner*—Bao Q. Vu

(57) ABSTRACT

A description is given of a power supply unit, an X-ray device having a power supply unit, and a method of controlling a power supply unit. In order also to control non-linear control paths, such as of a power supply unit operated with mixed-mode modulation, it is proposed that the control device be designed as a digital control device which calculates at least one correcting variable. The control device processes at least a first actual value $U_{out}$, which depends on the output voltage. A time difference value is calculated from two sample values of the first actual value $U_{out}$ and is multiplied by a first controller coefficient $K_{out}$. The value of the first controller coefficient can in this case change as a function of the operating point of the power supply unit.

11 Claims, 6 Drawing Sheets

DIGITAL STATE CONTROLLER FOR A HIGH-VOLTAGE GENERATOR USING THE MIXED-MODE MODULATION METHOD

The invention relates to a power supply unit, in particular for supplying high-voltage power, to an X-ray device having a power supply unit and to a method of controlling a power supply unit.

Particularly in the high-voltage sector, power supply units are used for example as power supply for X-ray tubes, in which, by means of a converter circuit, an intermediate circuit DC voltage is converted into a switched voltage, for example into a pulse-width-modulated (PWM) or pulse-frequency-modulated (PFM) voltage. A resonant circuit that has a transformer is fed with the switched voltage. On the secondary winding an output voltage is tapped off—where appropriate after rectification and/or passing through a multiplier circuit to increase the voltage. The resulting output voltage can be used, for example, to supply an X-ray tube.

In high-voltage generators, the aim of development is to be able to construct small and compact generators. In order to be able to make the switching device smaller and more compact for this purpose, a reduction in the switching losses is required.

WO 01/37416 proposes an actuation method for a power supply unit, in which various operating modes are provided for low, medium and high output voltages. The operating modes differ in terms of the type of actuation of the switching device and thus in terms of the switched voltage supplied. In a first operating mode for low output powers, the switching device is actuated in a non-resonant manner (i.e. below half the resonant frequency of the circuit) at an essentially fixed frequency by varying the sampling conditions (pulse width modulation, PWM).

In a second operating mode for medium output powers, the output power is controlled by changing the switching frequency, but with the switching frequency still remaining below half the resonant frequency.

Finally, in a third operating mode for high output powers, the switching frequency is above half the resonant frequency. Fully resonant operation takes place at maximum output power. In this case, too, the output power is adjusted by changing the switching frequency (PFM).

This type of actuation is referred to as mixed-mode modulation. It has been found that the switching losses can as a whole hereby be considerably reduced.

Particularly in X-ray applications, high demands are placed on the control of the output voltage. For instance, a rise time that is as short as possible and an overshoot at the end of the voltage run-up that is as small as possible are to be strived for in order to quickly reach the steady state and avoid exposing the patient to a dose of radiation that is undesirably high.

EP 1 081 839 describes a series resonant converter, in particular to be used for X-ray devices, having a control circuit. The control circuit is designed as a digital control circuit having control in the state space. Besides the output voltage, the voltage across the resonant capacitor is used as control variable. In order to rule out destruction of components on account of overloading, this control variable is subject to a limit function.

While the control strategy described in EP 1 081 839 gives good results in conventional switching devices, problems arise in the case of highly non-linear control paths. A power supply circuit operated with mixed-mode modulation is one example of such a non-linear control path.

It is an object of the invention to specify a power supply unit having a control device and also a method of controlling a power supply unit, where good control is achieved even in the case of highly non-linear behavior. Furthermore, it is an object of the invention to specify an X-ray device having a power supply unit controlled in this way.

This object is achieved by a power supply unit as claimed in claim 1, an X-ray device as claimed in claim 10 and a method as claimed in claim 11. Dependent claims relate to advantageous embodiments of the invention.

The power supply unit comprises a switching device, for example a half or full bridge. As a result, a resonant circuit, preferably having a resonant capacitor and a transformer, is supplied with power. The switching device can be controlled. Actuation is predefined by a control device.

The control device according to the invention is preferably designed as a digital control device. At least one correcting variable is calculated. Preferably, a scalar correcting variable is calculated, from which the actuation for the switching device. i.e. switching frequency and pulse width or pulse duty factor of the switched voltage that is to be generated, can be determined unambiguously.

The control device according to the invention processes, as first actual value, a value which depends on the output voltage. In addition, a second actual value can be processed, which depends on the current flowing through the resonant circuit elements. Preferably, this is the voltage across a resonant capacitor. The actual values are linked according to the respectively selected control structure for calculating the correcting variable. Controller coefficients are used, by which processed variables are multiplied.

The particular feature of the solution according to the invention is that one or more, preferably all, controller coefficients used can change not in a constant manner but rather as a function of the operating point. Within the digital control device, they can be formed, for example, as a look-up table, so that they assume different values in different operating states of the power supply unit.

The respective operating point can be given by the electrical variable of the power supply unit or by a variable of the control, or by a combination of a number of variables. Preferably, those variables will be used that are a measure of the power supplied.

In order that a variation of the controller coefficients, which for example may be subjected to extremely large variations when changing between different operating modes in the case of mixed-mode modulation, does not lead to a discontinuous change in the correcting variable, according to the invention a controller that operates differentially is proposed. That is to say that the controller does not process measured values of the actual values themselves, but rather changes of such measured values over time. In the case of the proposed digital control device, therefore, the differences between sample values at various sampling instances, preferably at sampling instances that directly follow one another, are calculated and used in the calculation of the correcting variable. The differential principle makes it possible for there to be a continuous starting variable despite high variation in the controller parameters.

It has been shown that, using such a controller, the high demands placed on a controlled high-voltage power supply can be met, even for X-ray tubes, despite the use of mixed-mode modulation.

In the control, the intermediate circuit voltage can be assumed to be constant. Since, however, this may also fluctuate for example as a function of the load, in order to achieve even better control properties it is proposed, according to a development of the invention, that the control device processes the intermediate circuit voltage as an additional input variable. Within the control device any deviations of the intermediate circuit voltage can then be compensated.

As already mentioned, preferably some or all of the controller coefficients are dependent on the operating point. They may be stored in corresponding tables. The coefficients can be calculated by a complete controller design being carried out for each operating point. The respective tables for the operating-point-dependent controller coefficients can be one-dimensional or multidimensional, that is to say that the respective controller coefficient is dependent on one or more variables. Two-dimensional look-up tables are preferred, in which the respective controller coefficient is determined as a function of a pair of values from two indexing variables. It is preferred that the first indexing variable depends on the correcting variable calculated by the controller and the second indexing variable depends on one or more of the processed actual values. In a preferred embodiment, a time-delayed correcting variable is used as first indexing variable and a difference between two processed actual values, namely the output voltage and the voltage across the resonant capacitor, is used as second indexing variable.

The preferred basic structure of the control device is that of a differential PI controller. In a preferred embodiment, the control deviation and difference values of the processed actual values and a coupled-back, time-delayed difference value of the correcting variable are in each case multiplied by controller coefficients and summed. The result is in turn temporally summed in order to calculate the correcting variable. Preferably all controller coefficients can change as a function of the operating point.

According to a development of the invention, a specific control is provided by means of which the destruction of components on account of overloading is prevented. In a series resonant converter, this relates in particular to the resonant current, that is to say the current through the series resonant elements. By limiting this current or the voltage across the resonant capacitor, overloading can be prevented. For the purpose of such limiting, the control device comprises, in addition to the first controller unit for controlling the output voltage, a second controller unit which predefines a second correcting variable in order to regulate the voltage across the resonant capacitor to a maximum value. If the correcting variable predefined by the first controller unit exceeds the correcting variable predefined by the second controller unit, then the correcting variable is limited to the latter value.

In this way, dynamic limiting is achieved which during normal operation does not interfere with the actual control. Limiting only takes place if the first controller unit predefines a correcting variable that could lead to a critical operating state. On account of this limiting, overall a faster response time can be achieved since the first controller unit can be designed to operate the components of the power supply unit closer to their power limit.

According to a development of the invention, the control device is designed in a digital manner, for example by means of a DSP which executes a corresponding program. If at high resonant frequencies the timing-intervals are too short to carry out all necessary calculations, it may be provided that only measured values of some of the timing intervals are processed, for example the measured values during every second, third, etc. timing interval.

The invention will be further described with reference to examples of embodiments shown in the drawing to which, however, the invention is not restricted.

Figure 1:
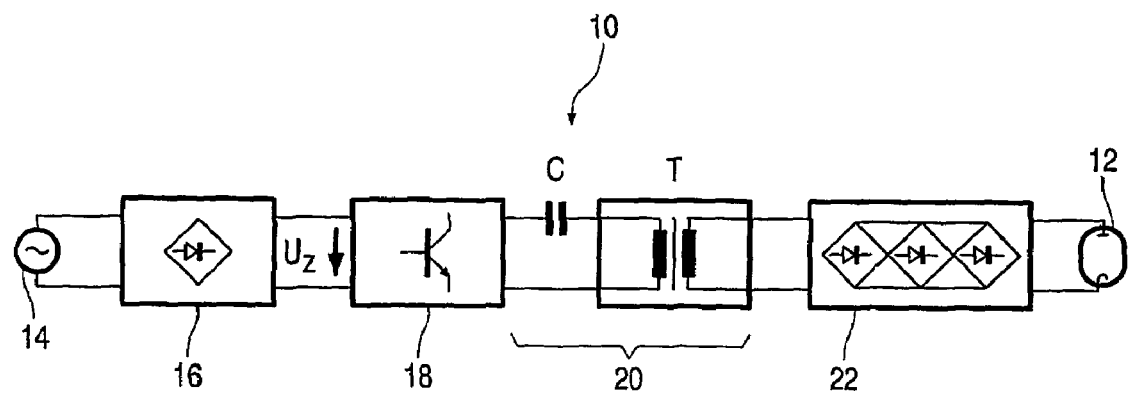
FIG. 1 shows a schematic circuit diagram of a high-voltage power supply unit for an X-ray tube.

FIG. 1 shows a power supply unit 10 for an X-ray tube 12. An AC voltage supply 14—for example a connection to the power supply network—supplies, after rectification by means of a rectifier unit 16, an intermediate circuit voltage $U_Z$, with which a switching unit 18 is supplied. The switching unit 18 converts the intermediate circuit DC voltage $U_Z$ into a switched voltage with which a resonant circuit 20 having a series capacitor C and a transformer T is supplied. On the secondary of the transformer T, an output voltage is generated via a multiplier circuit 22 that is known per se, with which output voltage the X-ray tube 12 is supplied.

Figure 2:
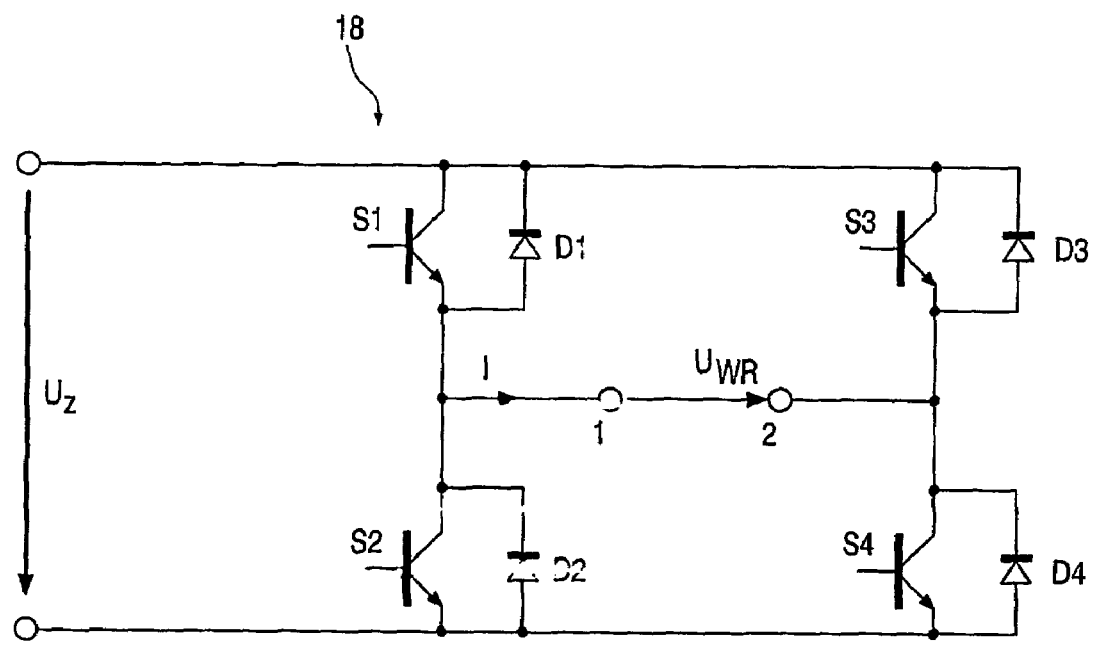
FIG. 2 shows a circuit diagram of a switching device.

FIG. 2 shows a circuit diagram of the switching device 18. In the example shown, this is a full bridge circuit, in which the input DC voltage $U_Z$ is converted into a switched output voltage $U_{WR}$ by means of four controlled switches S1, S2, S3, S4. Antiparallel diodes D1, D2, D3, D4 are in each case assigned to the switches S1, S2, S3, S4. The current flowing between the half bridges is designated I.

Figure 3:
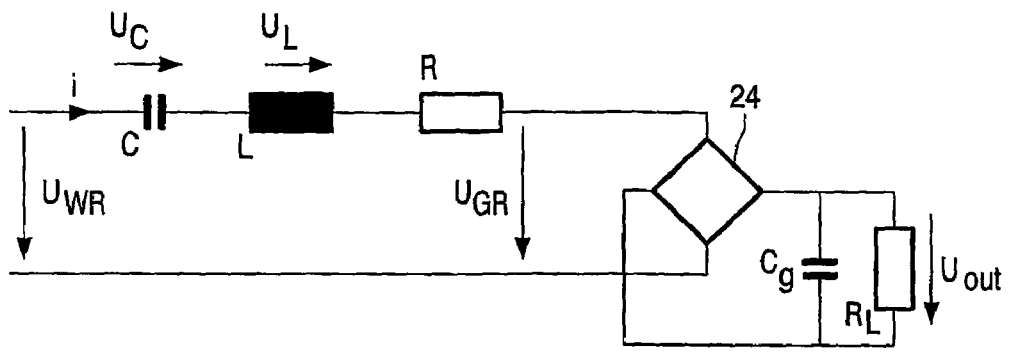
FIG. 3 shows an equivalent circuit diagram of a resonant converter.

As shown in FIG. 1, the resonant circuit that is supplied by the switching unit 18 comprises a series capacitor C and a transformer T. By making a few simplifications (replacement of the multiplier circuit 22 by a bridge rectifier 24 and an ideal transformer having a constant winding ratio, infinitely high main inductance of the transformer T, neglecting of losses during rectification and neglecting of the parasitic capacitance of the transformer T) and also the transformation of all electrical variables to the primary of the transformer T, the equivalent circuit diagram shown in FIG. 3 is obtained. The voltage across the resonant capacitor C is designated $u_C$. The leakage inductance of the transformer T is designated L and the voltage across this is designated $u_L$. The ohmic loss of the transformer T is represented by the resistor R. Across the ideal rectifier 24 there is the AC voltage $u_{GR}$, from which the voltage $u_{out}$ is generated that supplies a load capacitor $C_g$ and a load resistor $R_L$ which represent the tube 12.

The power supply unit 10 is operated with mixed-mode modulation as described in WO 01/37416. The content of said document is fully incorporated herein in relation to this actuation method. In the mixed-mode modulation that is used, three different operating modes with different actuation are distinguished. These three operating modes will be described below with reference to FIGS. 4a, 4b and 4c.

Figure 4A:
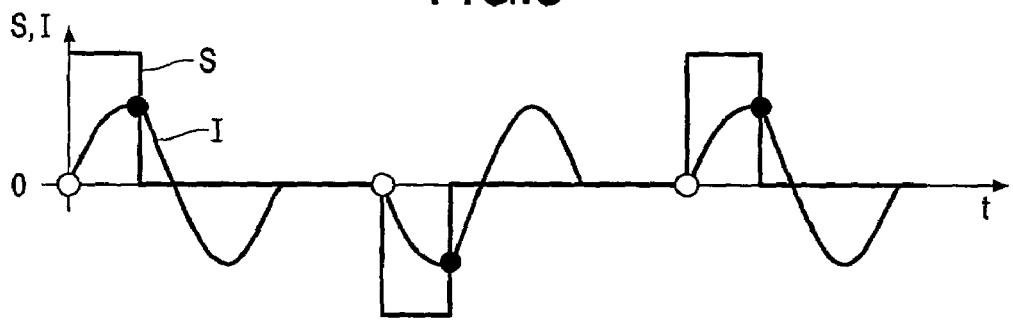
FIGS. 4a–4c show a schematic diagram of the variation over time of a switched voltage and of a resonant current in a first, second and third operating mode.

In a first operating mode, the switching device 18 is actuated such that the switched voltage $U_{WR}$ that is supplied is a pulse-width-modulated voltage. A low, fixed switching frequency is used. FIG. 4a shows, for this first operating mode, the variation of the current I and the actuation of the switches S1, S2, S3, S4 on the basis of a switching variable S (when S=1, S1 and S4 are on and S2 and S3 are off; when S=0, all switches are off; when S=1, S2 and S3 are on and S1 and S4 are off). Control is effected by varying the degree of sampling. The first operating mode is used for low output power.

Figure 4B:
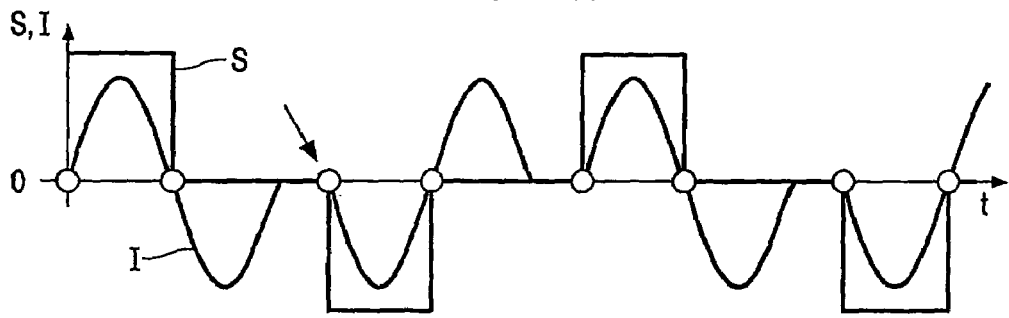

In the second operating mode, the degree of sampling is constantly at the maximum, i.e. half the resonant period. The switching frequency can vary between the low frequency used in the first operating mode and half the resonant frequency of the circuit 20. FIG. 4b shows the variation of the current in the case of this actuation. The output power is adjusted by means of pulse frequency modulation (PFM). The second operating mode is used for medium output powers.

Figure 4C:
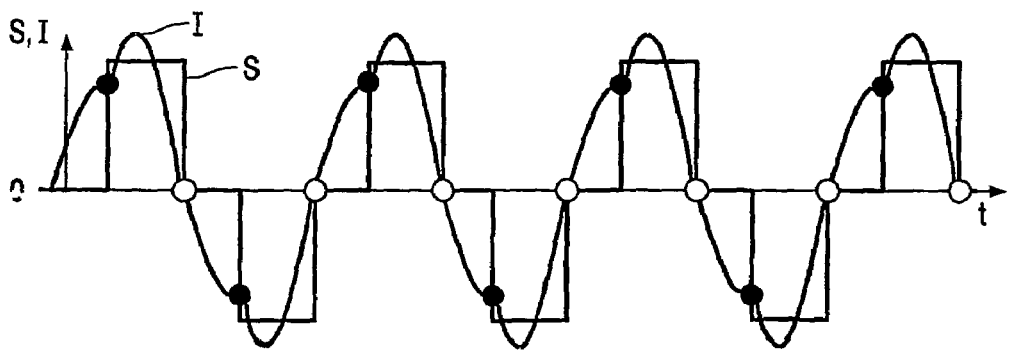

In the third operating mode, the circuit 20 is operated in a resonant manner. The switching frequency can vary above half the resonant frequency of the circuit 20. The pulse width is obtained from the zero crossing of the resonant current. The active pulse is terminated with the zero crossing. FIG. 4c shows the corresponding variation over time of the electrical variables. Using the excess resonance, the output power is adjusted by means of pulse frequency modulation. The third operating mode is used for operation at high output powers.

Figure 5:
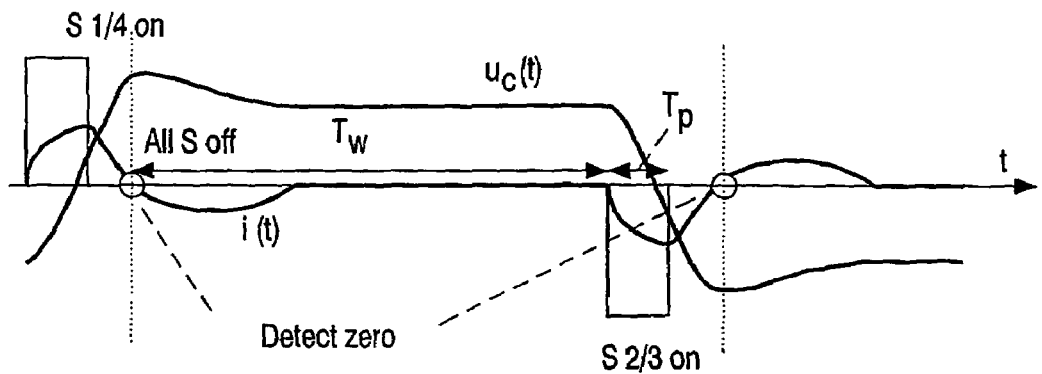
FIG. 5 shows the variation over time of currents and voltages in FIG. 3.

FIG. 5 shows the variation over time of the variables $u_C(t)$, $u_{WR}$ and $i(t)$. Some variables will be defined on the basis of this diagram. A timing interval begins with a zero crossing of the current ("Detect Zero" result). After a time $T_W$, an active phase begins in which the positive (S1, S4) or the negative (S2, S3) diagonal of the full bridge 18 is activated. The active phase lasts for an interval $T_P$ and is terminated by the zero crossing of the current. After this, all switches are switched off. At the next zero crossing, a new timing interval begins with the opposite active phase. The values $T_W$ and $T_P$ are predefined by the control device. For easier handling, $T_W$ and $T_P$ are standardized to half the resonant frequency (which is known) of the resonant circuit 20. The three operating modes can then be characterized as follows in terms of $T_W$ and $T_P$:

| Low Power: | $T_W = T_{W, max}$; | $0 < T_P < 1$ |
|---|---|---|
| Medium Power: | $1 < T_W < T_{W, max}$; | $T_P = 1$ |
| High Power: | $0 < T_W < 1$; | $T_P = 1$. |

Figure 6:
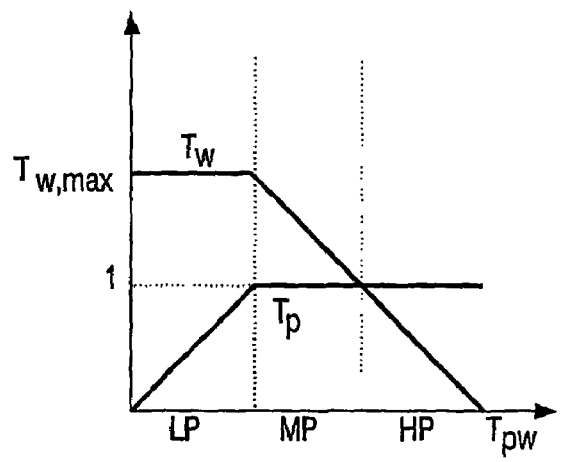
FIG. 6 shows a diagram with the mutual dependency of the variables $T_W$, $T_P$ and $T_{PW}$.

As a result, it is possible to define a scalar value $T_{PW}$, by means of which the values $T_P$ and $T_W$ are in each case defined. FIG. 6 shows the non-linear relationship between $T_P$, $T_W$ and $T_{PW}$.

Figure 7:
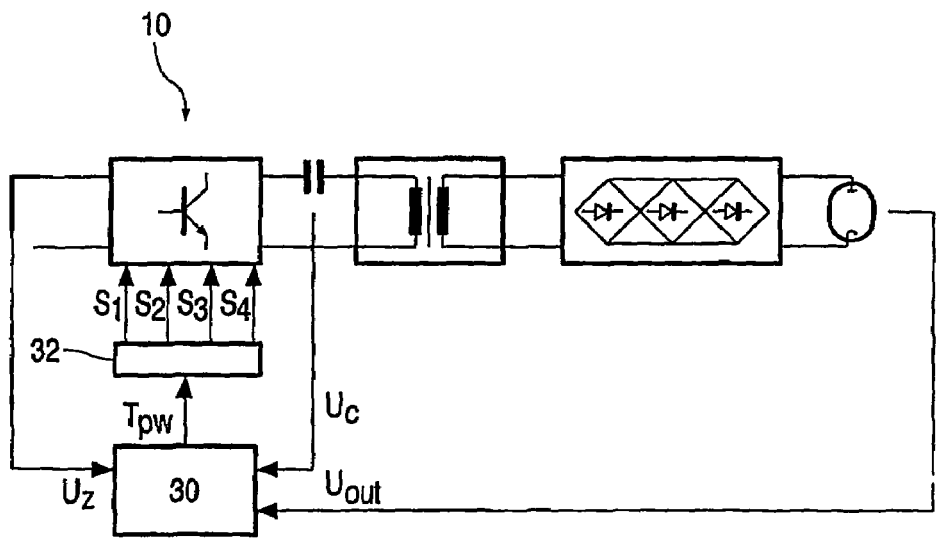
FIG. 7 shows a schematic diagram of a power supply unit with control.

In a symbolic representation, FIG. 7 shows how the power supply unit 10 is controlled. The voltage $U_C$ across the resonant capacitor and the output voltage $U_{out}$ are measured, sampled and fed to a controller 30. The controller 30 predefines a value $T_{PW}$ as correcting variable, and this is converted in a driver 32 first into the values $T_W$ and $T_P$ and then into the corresponding actuation for the switches S1, S2, S3, S4. In addition, the controller 30 also processes sampled measured values of the intermediate circuit voltage $U_Z$, in order to compensate for any fluctuations in this intermediate circuit voltage.

The functional blocks controller 30 and actuation 32 in FIG. 7 can be implemented in whole or in part as software solutions. A DSP implementation is preferred. When carrying out the calculations, in the high power mode only short time periods of less that the resonant period are available. If the resonant frequency of the controlled system is high and thus the resonant period is short and these temporal framework conditions are too small to carry out the necessary calculations, an implementation can be selected in which the measurements are only carried out at every second "Detect Zero" result. In the time available, the measured values are digitized and the calculations to determine the correcting variable $T_{PW}$ are carried out.

Figure 12:
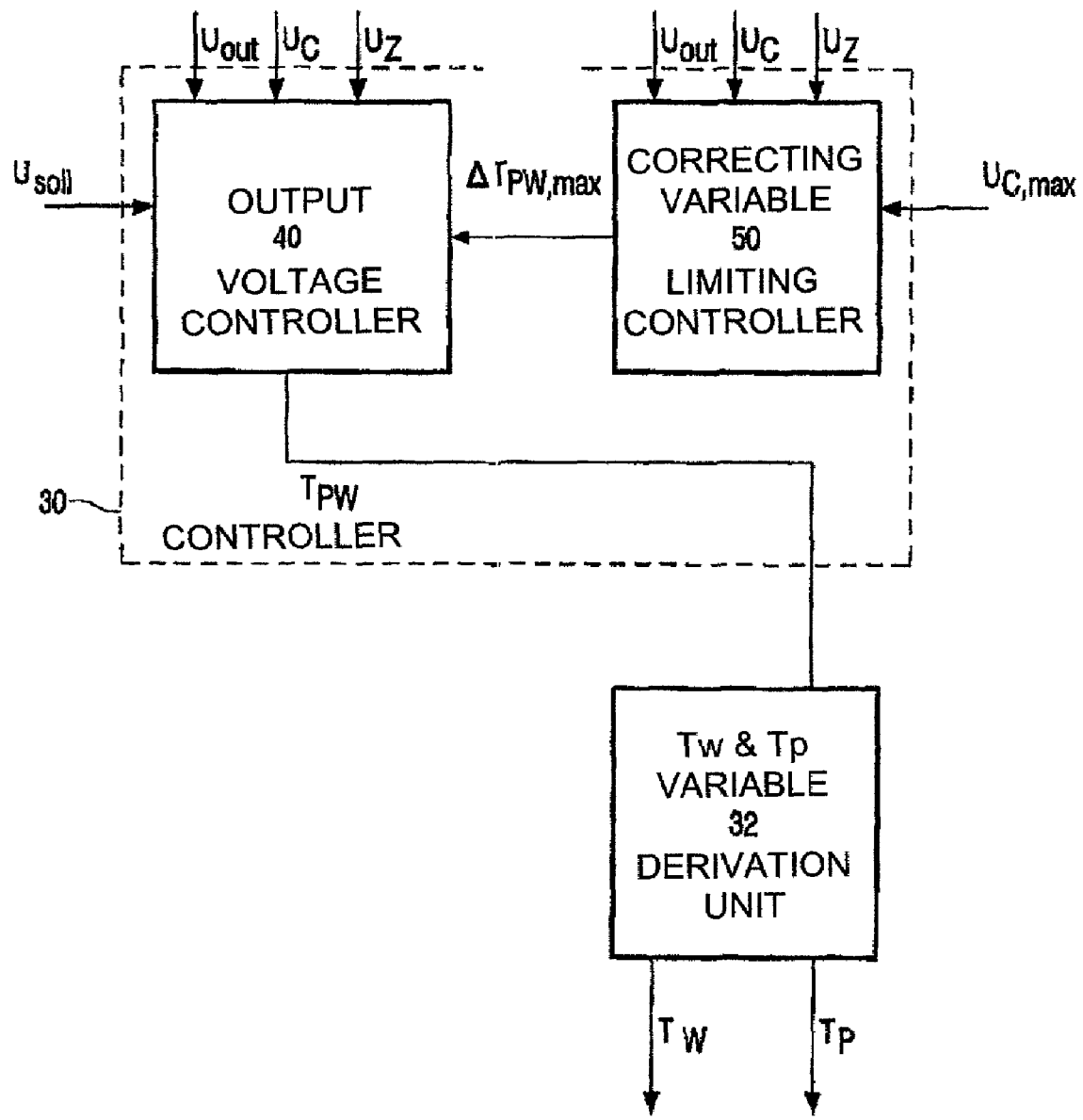
FIG. 12 shows a controller diagram of one embodiment of a complete control device.

The control structure implemented by DSP is a digital state space control. FIG. 12 shows, in a controller diagram, the overall structure of the controller 30. However, before more details are given in respect of the implementation shown in FIG. 12, parts thereof will first be described individually.

Figure 8:
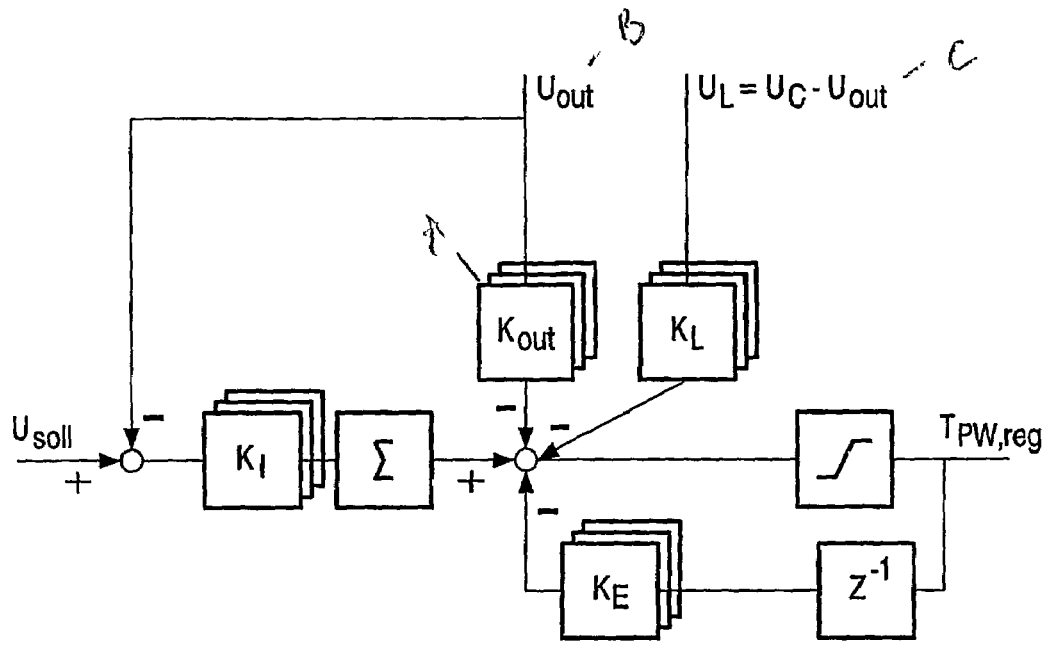
FIG. 8 shows a controller diagram of a PI controller.

FIG. 8 firstly shows the PI basic structure of the controller used. Actual values $U_{out}$ and $U_L = U_C - U_{out}$ are processed. The starting voltage $U_{out}$ is to be controlled to a desired value $U_{soll}$. The processed actual values $U_{out}$, $U_L$ are multiplied by controller coefficients $k_{out}$, $k_L$. The control deviation $U_{soll} - U_{out}$ is multiplied by a controller coefficient $k_I$ and temporally summed, which corresponds to discrete integration. The value of the correcting variable $T_{PW,reg}$, which is delayed by a time unit, is multiplied by the controller coefficient $k_E$. The variables that are in each case multiplied by the controller coefficients $k_{out}$, $k_L$, $k_I$, $k_E$ are summed with signs as shown in FIG. 8 and subjected to a limit function in order to form the correcting variable $T_{PW,reg}$.

However, the controller coefficients $k_{out}$, $k_L$, $k_I$, $k_E$ in FIG. 8 are generally not constant. Rather, they depend on the respective operating point of the power supply unit 10. The variable $U_L$, where appropriate resolved by compensation for fluctuations of the intermediate circuit voltage $U_Z$, as mentioned below, and the control variable $T_{PW, reg, old}$ of the previous calculation interval are used as indexing variables for the operating point.

When calculating $T_{PW,reg}$ of the control structure shown in FIG. 8, in each case a set of controller coefficients $k_{out}$, $k_L$, $k_I$, $k_E$ that corresponds to the current operating point is used in the current calculation. The respective values of each of these coefficients are stored in a two-dimensional look-up table where the respective values for $k_{out}$, $k_L$, $k_I$ and $k_E$ are stored for a number of pairs of values of the indexing variables $U_L$ and $T_{PW,old}$. For a given, current operating point, i.e. actual values for $U_L$ and $T_{PW,old}$, firstly the next pair of these indexing variables is determined from this look-up table and then the associated, stored value for the respective controller coefficient is used. As an alternative to selecting the next pair, it would also be possible to interpolate the respective value of the controller coefficient in a suitable manner if there is sufficient calculation time to do so.

In order to fill the look-up table with the corresponding settings for the coefficients $k_{out}$, $k_L$, $k_I$, $k_E$ for pairs of indexing values $U_L$, $T_{PW,old}$, a complete design of the controller is required for each operating point.

The following model can be used to determine the controller parameters. $U_{out}$ and $U_C$ are sampled states which are derived from the respective measured variables at the current zero crossing of the resonant current. The dynamic response of these variables is described by the state model $$\begin{pmatrix} U_L \\ U_{out} \end{pmatrix}_{k+1} = A \begin{pmatrix} U_L \\ U_{out} \end{pmatrix}_k + bE(U_{L,k}, T_{PW,k})$$

where the state variable $U_L$ is a composed variable $$U_{L,k} = U_{C,k} - U_{out,k}.$$

A and b represent system matrices which depend on parameters of the power supply unit 10. The non-linear function E depends on the state variable $U_L$ and the control variable $T_{PW}$. It is clearly defined by the converter parameters and the control method.

In order to design the controller, the non-linear function is linearized in an operating point ($U_{L0}$, $T_{PW0}$). The resulting linear model is expanded by two additional states. The state $\Sigma$ represents the sum over the control deviation and is used to model the integral fraction, whereas the state $T_{PWsys}$ serves to model a digital delay between calculation and switching on of a new manipulated value $T_{PW}$. This leads to an expanded system model $$\begin{pmatrix} U_L \\ U_{out} \\ \Sigma \\ T_{PWsys} \end{pmatrix}_{k+1} = \begin{pmatrix} A & 0 & b \\ & 0 & \\ 0 & -1 & 1 & 0 \\ 0 & 0 & 0 & 0 \end{pmatrix} \begin{pmatrix} U_L \\ U_{out} \\ \Sigma \\ T_{PWsys} \end{pmatrix}_k + \begin{pmatrix} 0 \\ 0 \\ 0 \\ 1 \end{pmatrix} T_{PW} + \begin{pmatrix} 0 \\ 0 \\ 1 \\ 0 \end{pmatrix} U_{soll}.$$

The parameters of a state controller $$T_{PW} = -(k_L \ k_{out} \ k_I \ k_e) \begin{pmatrix} U_L \\ U_{out} \\ \Sigma \\ T_{PWsys} \end{pmatrix}$$

can be determined according to the pole placing method—i.e. a design by eigenvalue settings or pole settings (see, for example, O. Föllinger, "Lineare Abtastsysteme [Linear sampling systems]", R. Oldenburg Verlag, 1982, Section 7.6). It is assumed that, in previous steps, firstly the desired dynamic properties of the system, such as rise time, maximum overshoot, etc., are predefined, and from these settings corresponding eigenvalues of the system matrix are determined. If an overshoot of the system is to be avoided altogether, which is often the case, this requires purely real eigenvalues without any imaginary part.

The above-described design is carried out for all possible combinations of values $U_{L0,1}$ to $U_{L0,n}$ and $T_{PW0,1}$ to $T_{PW0,m}$. The controller parameters that are obtained are written into the various tables which are evaluated by the DSP as a function of the operating point.

Figure 9:
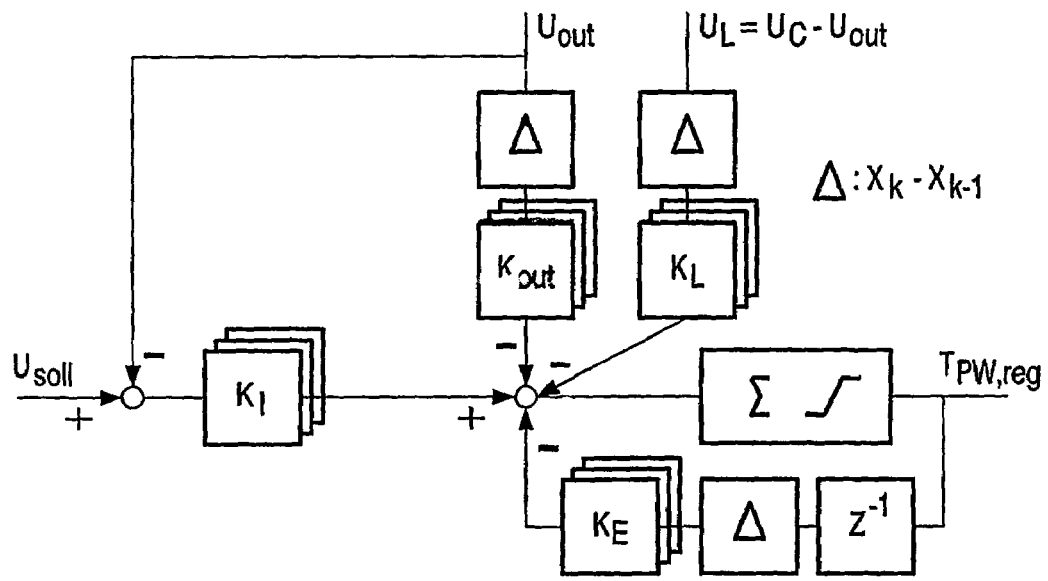
FIG. 9 shows a controller diagram of a differential PI controller.

However, the fundamental PI controller structure as shown in FIG. 8 is not used directly in the controller 30. Rather, as shown in FIG. 9, this structure is expanded by a differential component. In this case, it is not the values per se of the actual values $U_{out}$ and $U_L$ and of the fed-back correcting variable $T_{PW,reg}$ that are used, but rather difference values of the current sampling value to the previous sampling value. In FIG. 9, corresponding difference units $\Delta$ are additionally added to the basic structure (FIG. 8). By moving the temporal summation $\Sigma$ behind the summation point, the correcting variable $T_{PW,reg}$ is again calculated from this. The advantage of the differential structure shown in FIG. 9 over the basic structure shown in FIG. 8 is that the operating-point-dependent changes of the controller parameters have an effect firstly in the differential domain. By means of the subsequent temporal summation (discrete integration), a continuous change in the correcting variable $T_{PW,reg}$ is thus ensured even in the event of changes to the parameters $k_{out}$, $k_L$, $k_I$, $k_E$.

Figure 10:
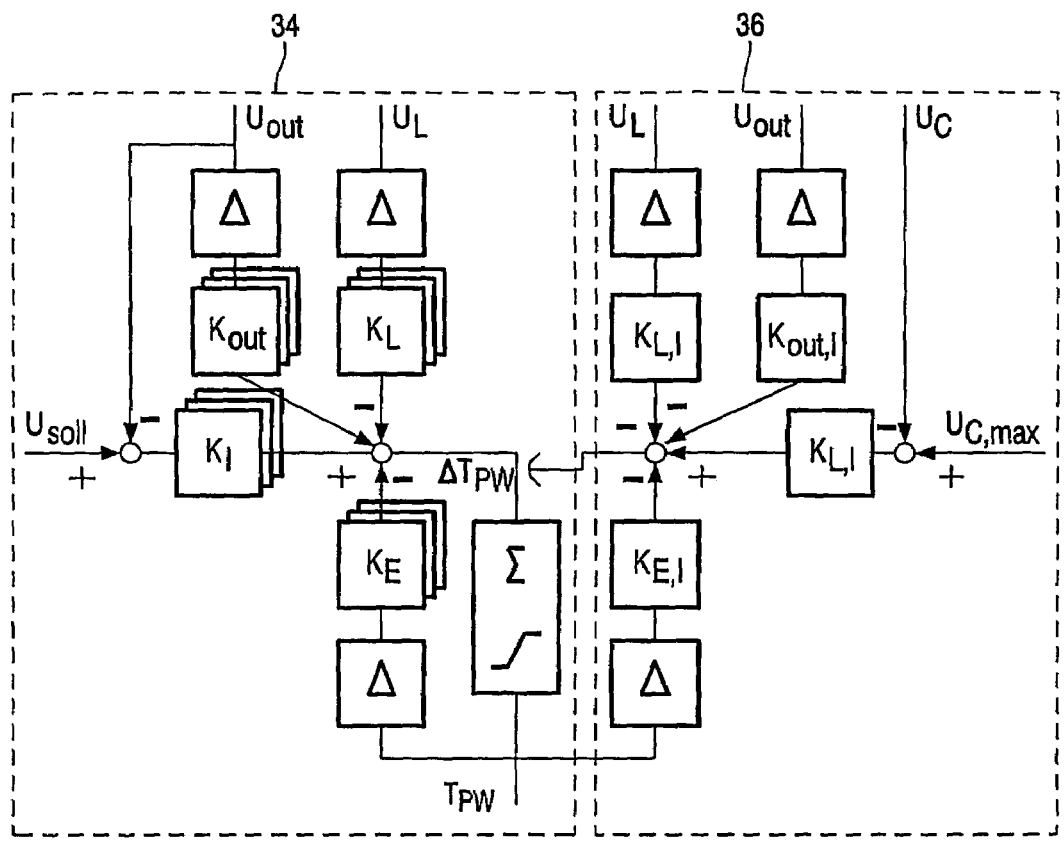
FIG. 10 shows a controller diagram of a control device having two control units.

FIG. 10 shows two controller units 34, 36. The controller unit 34 shown on the left in FIG. 10 corresponds to the representation in FIG. 9 and is used to regulate the output voltage $U_{out}$ to the desired value $U_{soll}$.

The controller unit 36 shown on the right in FIG. 10 has the same structure as the controller unit 34. However, in the example shown, the controller parameters $k_{L,I}$, $k_{out,I}$, $k_{I,I}$, and $k_{E,I}$ are in this case not dependent on the operating point (in an alternative embodiment these parameters can also be dependent on the operating point). The control deviation is formed from the actual value of the voltage across the resonant capacitor $u_C$ and a fixedly set permissible maximum value $U_{C,max}$ for this voltage. The value $U_{C,max}$ corresponds to a value for the voltage across this capacitor at which there is no damage resulting from overloading of the circuit 20. The controller unit 36 supplies a correcting variable $\Delta T_{PW}$ (still in the differential domain), by means of which actuation takes place such that the voltage $U_C$ is regulated to the permissible maximum value $U_{C,max}$.

The two controller units 34, 36 are linked via a limit function. The correcting variable $\Delta T_{PW}$ supplied by the left-hand controller unit 34 is used (following temporal summation) for actuation for as long as it does not exceed the value predefined by the right-hand controller unit 36. The controller unit 36 is not used during normal operation. Only when values $\Delta T_{PW}$ that are too high are defined does the controller unit 36 limit $\Delta T_{PW}$ to the respectively dynamically determined maximum value at which a permissible $U_C$ is still achieved.

Figure 11:
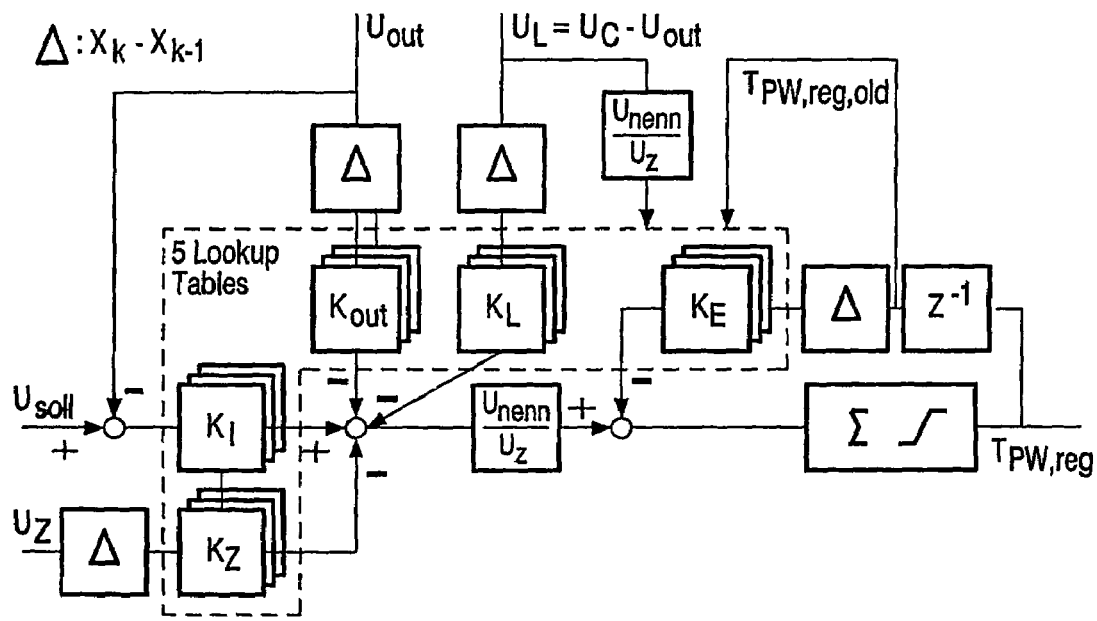
FIG. 11 shows a controller diagram having a differential PI controller with operating-point-dependent controller coefficients and compensation for the intermediate circuit voltage.

FIG. 11 shows an additional extension of the controller structure of FIG. 9. In this case, a measured value for the intermediate circuit voltage $U_Z$ is processed using an additional controller coefficient $k_Z$. In the functional blocks $$\frac{U_{nenn}}{U_Z},$$

in each case multiplication takes place by a standardization factor which is equal to one if $U_Z$ corresponds to the nominal value of $U_{nenn}$.

The controller coefficients $k_{out}$, $k_L$, $k_I$, $k_E$, $k_Z$ are dependent on the operating point. In FIG. 11, arrows show how the look-up tables are oriented by the indexing variables $T_{PW,reg,old}$ and $$U_L \left( \text{standardized to } \frac{U_{nenn}}{U_Z} \right).$$

The components explained above in connection with FIGS. 8–11 are added to the completed controller 30 shown in FIG. 12. Shown on the left in FIG. 12 is a controller 40 for the output voltage (cf. FIG. 11). On the right, there is a controller 50 for limiting the correcting variable $T_{PW}$ to a value which leads to a permissible voltage value $U_C$ (cf. FIG. 10 and the associated explanations).

Finally, by means of the unit 32, using the relation shown in FIG. 6, the variables $T_W$ and $T_P$ are derived from the value $T_{PW}$.

By means of simulation and subsequent practical checking, it was possible to show that, using the shown controller structure, highly precise control can be achieved in the case of mixed-mode modulation.

The invention claimed is:

1. A power supply unit comprising:
a switching device (18) for converting an intermediate circuit voltage ($U_z$) into a switched voltage ($U_{WR}$);
a resonant circuit (20) that is fed by the switched voltage ($U_{WR}$) and has a transformer (T) for supplying an output voltage; and
a control device (30, 32) for setting at least one correcting variable ($T_{PW}$), the control device being configured for converting the correcting variable ($T_{PW}$) into values of wait time interval ($T_W$) and active phase time interval ($T_P$) for actuating the switching device (18) according to a non-linear relationship between $T_P$, $T_W$ and $T_{PW}$ for three operating modes of mixed mode modulation, the three operating modes corresponding to low output power, medium output power, and high output power modes,
wherein the control device (30, 32) is configured to process sample values of at least a first actual value ($U_{out}$) which depends on the output voltage, and to calculate a time difference value ($\Delta U_{out}$) from two sample values,
wherein the time difference value ($\Delta U_{out}$) is multiplied by a first controller coefficient ($k_{out}$) and the result is used in the calculation of the correcting variable ($T_{PW}$), and
wherein the value of the first controller coefficient ($k_{out}$) is changeable as a function of the operating point of the power supply unit.

2. A power supply unit as claimed in claim 1, wherein during the calculation of the correcting variable ($T_{PW}$) a second actual value ($U_L$) is processed, which second actual value depends on the current through the resonant circuit (20),
where a time difference value ($\Delta U_L$) is calculated from sample values of the second actual value ($U_L$) and is multiplied by a second controller coefficient ($k_L$), and
where the value of the second controller coefficient ($k_L$) is changeable as a function of the operating point of the power supply unit (10).

3. A power supply unit as claimed in claim 1, wherein the control device (30, 32) processes the intermediate circuit voltage ($U_Z$) as a third actual value,
where the processing is preferably effected in that a difference value of the intermediate circuit voltage ($\Delta U_Z$) is multiplied by a controller coefficient ($k_Z$) and added to other variables, and the result is temporally summed, and
where the controller coefficient ($k_Z$) is preferably changeable as a function of the operating point of the power supply unit (10).

4. A power supply unit as claimed in claim 1, wherein the control device (30, 32) has a structure in which the control deviation, difference values ($\Delta U_{out}$, $\Delta U_L$) from actual values and a coupled-back, time-delayed difference value of the correcting variable ($T_{PW}$) are in each case multiplied by controller coefficients ($k_I$, $K_{out}$, $k_L$, $k_E$) and added up,
and the result is temporally summed, and where one, a number, or all of the controller coefficients ($k_I$, $K_{out}$, $k_L$, $k_E$) are changeable as a function of the operating point of the power supply unit (10).

5. A power supply unit as claimed in claim 1, wherein the operating-point-dependent controller coefficient or coefficients ($k_{out}$, $k_L$, $k_E$, $k_I$, $k_Z$) are taken from two-dimensional tables,
where each table contains for each pair of values of a first indexing variable, which depends on the correcting variable ($T_{PW}$),
and a second indexing variable, which depends on one or more of the processed actual values ($U_L$), and
the respective value of the controller coefficient ($k_{out}$, $K_L$, kL, $k_I$, $k_E$, $k_Z$).

6. A power supply unit as claimed in claim 1, wherein the control device (30, 32) supplies a scalar correcting variable ($T_{PW}$),
from which there is calculated a setting for actuating the switching device (18) in order to generate the switched voltage ($U_{WR}$).

7. A power supply unit as claimed in claim 1, wherein with a first operating mode for low output powers, the switching device (18) is actuated by the pulse width being changed at an essentially constant switching frequency that is lower than the resonant frequency at least by a predefined factor,
and in a second operating mode for higher output powers, the switching device (18) is actuated by the switching frequency varying in the region of the resonant frequency.

8. A power supply unit as claimed in claim 1, wherein the control device (30, 32) comprises at least a first controller unit (34) and a second controller unit (36),
where the first controller unit (34) predefines a first correcting variable in order to regulate at least one actual value ($U_{out}$) to a desired value ($U_{soll}$),
and the second controller unit (36) predefines a second correcting variable in order to regulate an electrical variable of the resonant circuit (20) to a permissible maximum value,
and where in each case, the lower of the two correcting variables is used for actuation.

9. A power supply unit as claimed in claim 1, wherein the control device is formed as a digital control device having a central processing unit,
where measured values of at least a first actual value ($U_{out}$) are digitized and at least one correcting variable ($T_{PW}$) is calculated in order to supply a switched voltage having a timing interval,
where measured values of only some of the timing intervals are processed.

10. An X-ray device having
a power pack (14, 16) for supplying an intermediate circuit voltage ($U_Z$),
a power supply unit (10) as claimed in claim 1 which is supplied with power by the intermediate circuit voltage ($U_Z$),
and an X-ray tube (12) which is fed by the output voltage of the power supply unit (10).

11. A method of controlling a power supply unit (10) having a switching device (18) for converting an intermediate circuit voltage ($U_Z$) into a switched voltage ($U_{WR}$), and a resonant circuit (20) that is fed by the switched voltage ($U_{WR}$) and has a transformer (T), and possibly a rectifier circuit, for supplying an output voltage, the method comprising:

forming a correcting variable ($T_{PW}$) for actuating the switching device, wherein forming includes using a control device (30, 32) for setting at least one correcting variable ($T_{PW}$) and converting the correcting variable ($T_{PW}$) into values of wait time interval ($T_W$) and active phase time interval ($T_P$) for actuating the switching device (18) according to a non-linear relationship between $T_P$, $T_W$ and $T_{PW}$ for three operating modes of mixed mode modulation, the three operating modes corresponding to low output power, medium output power, and high output power modes;

calculating a time difference value ($\Delta U_{out}$) from sample values of a first actual value ($U_{out}$) and multiplying the time difference value by a first controller coefficient ($k_{out}$), the multiplication result being used in forming the correcting variable ($T_{PW}$), and where the value of the first controller coefficient ($k_{out}$) can change as a function of the operating point of the power supply unit (10).

* * * * *